(12) United States Patent
Wugofski

(10) Patent No.: US 6,556,219 B1
(45) Date of Patent: *Apr. 29, 2003

(54) METHOD AND SYSTEM FOR PERIPHERAL DEVICE USER INTERFACE CONSTRUCTION

(75) Inventor: Theodore D. Wugofski, Fort Worth, TX (US)

(73) Assignee: Gateway, Inc., Poway, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/313,669

(22) Filed: May 18, 1999

(51) Int. Cl.[7] .......................... G06F 3/00; G06F 13/14; H04N 5/50
(52) U.S. Cl. ........................ 345/762; 345/771; 345/717; 345/716; 725/37; 725/56; 710/63; 710/77
(58) Field of Search .................... 345/762, 765, 345/771, 970, 716, 717, 720, 740, 763, 773, 839; 348/734, 731; 725/38, 37, 56, 88, 102; 340/825.06, 825.17, 825.36; 709/321, 328, 323; 710/63–64, 72–73

(56) References Cited

U.S. PATENT DOCUMENTS

| | | | |
|---|---|---|---|
| 5,081,534 A | 1/1992 | Geiger et al. ............... 358/194 |
| 5,109,482 A | 4/1992 | Bohrman ..................... 395/154 |
| 5,132,679 A | 7/1992 | Kubo et al. ............ 340/825.22 |
| 5,202,961 A | 4/1993 | Mills et al. .................. 395/159 |
| 5,297,204 A | * | 3/1994 | Levine .................... 348/734 X |
| 5,396,546 A | 3/1995 | Remillard ..................... 379/96 |
| 5,410,326 A | * | 4/1995 | Goldstein ................... 348/734 |
| 5,457,478 A | * | 10/1995 | Frank ...................... 348/734 X |
| 5,473,317 A | 12/1995 | Inomata et al. ........ 340/825.25 |
| 5,475,835 A | 12/1995 | Hickey ....................... 395/600 |
| 5,519,457 A | 5/1996 | Nishigaki et al. ............ 348/734 |
| 5,570,085 A | 10/1996 | Bertsch ................. 340/825.07 |
| 5,600,310 A | 2/1997 | Whipple, III et al. .. 340/825.06 |
| 5,627,978 A | 5/1997 | Altom et al. ................ 395/330 |
| 5,631,652 A | 5/1997 | Lee .............................. 341/176 |
| 5,673,401 A | 9/1997 | Volk et al. ................... 395/327 |
| 5,675,753 A | 10/1997 | Hansen et al. .............. 395/333 |
| 5,692,205 A | 11/1997 | Berry et al. ................. 395/788 |
| 5,694,562 A | 12/1997 | Fisher ......................... 395/349 |
| 5,710,712 A | 1/1998 | Labun ......................... 364/492 |
| 5,745,767 A | 4/1998 | Rosen et al. ................. 395/704 |
| 5,774,187 A | 6/1998 | Tsunoda ..................... 348/553 |
| 5,774,528 A | 6/1998 | Bogner et al. ......... 379/106.01 |
| 5,793,366 A | * | 8/1998 | Mano et al. ................. 345/839 |
| 6,157,319 A | * | 12/2000 | Johns et al. ............. 348/734 X |
| 6,421,069 B1 | * | 7/2002 | Ludtke et al. .............. 345/762 |
| 6,456,892 B1 | * | 9/2002 | Dara-Abrams et al. . 709/328 X |

OTHER PUBLICATIONS

Grundig, A.G., "Eight Consumer Electronics Companies Release Home Audio/Video Interoperablitiy (HAVi) Core Specification for Networking Digital AV Appliances", *http://www.sharp.co.jp/sc/gaiyou/news–e/9803.htm*, 1–3, (May 14, 1998).

Yoshida, J., "Home Networks Grab Attention In the Digital Home", http://www.eet.com/news/98/1016news/home.html, 1–6, (Jul. 2, 1998).

* cited by examiner

*Primary Examiner*—Raymond J. Bayerl
(74) *Attorney, Agent, or Firm*—Rodney Lacy; Mark S. Walker

(57) ABSTRACT

Systems and methods provide for the construction of graphical user interface objects representing peripheral devices of a computer-based home entertainment system. The method includes providing a database of device functionality and user interface build elements, retrieving information about specific devices connected to the system, and constructing graphical user interface objects for specific and full functional and featural control of connected peripheral devices.

10 Claims, 4 Drawing Sheets

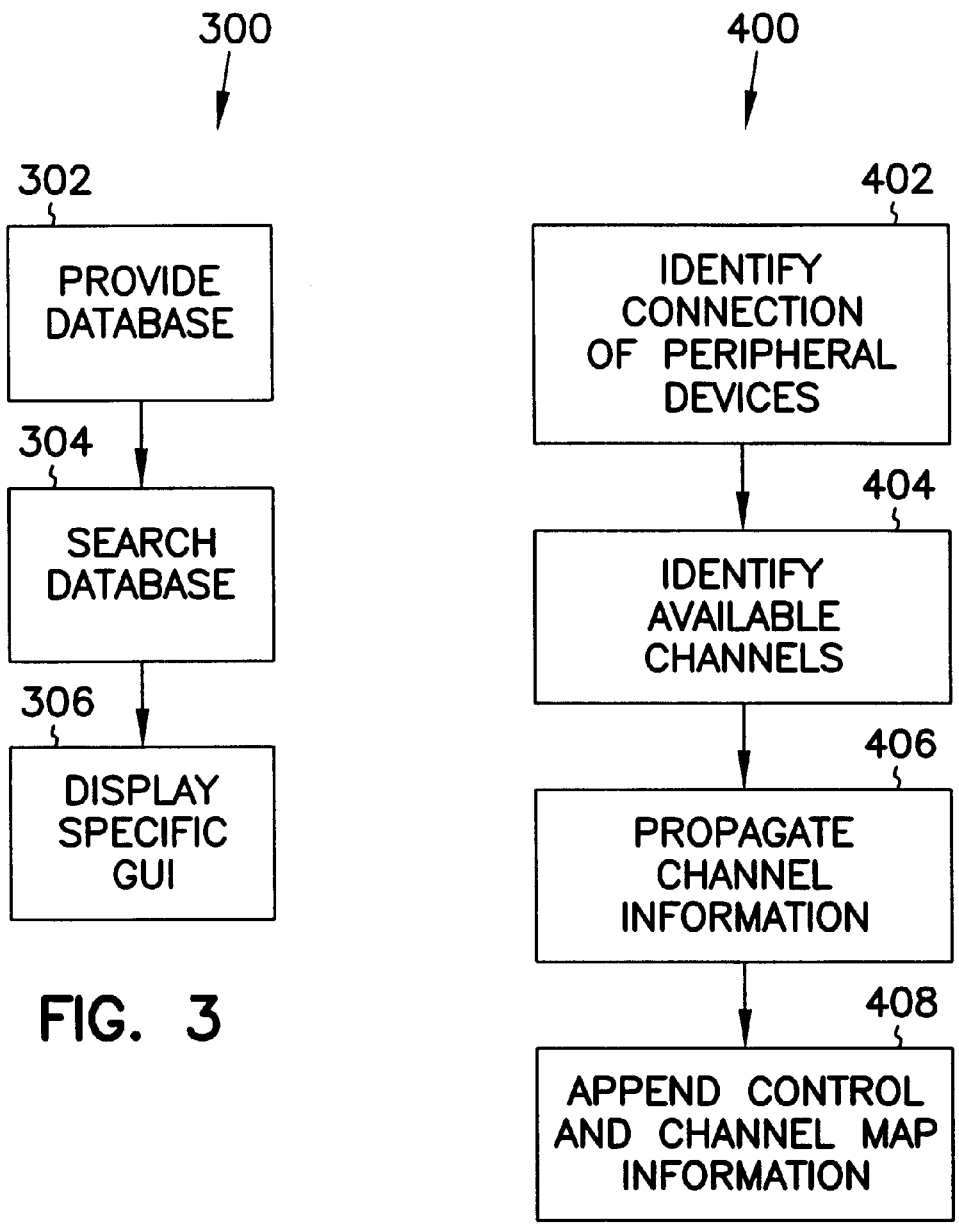

METHOD AND SYSTEM FOR PERIPHERAL DEVICE USER INTERFACE CONSTRUCTION

FIELD OF THE INVENTION

The present invention pertains to computerized entertainment systems and to methods of constructing user interfaces for those systems.

BACKGROUND OF THE INVENTION

The home electronics industry, in the midst of an on-going convergence of televisions and computers, has produced a new class of products, known as PC-TV systems, or personal-computer-television systems. In their simplest form, these systems allow users to selectively switch between using a video monitor, or display, to watch television or to support computer activities, like word processing, creating spread sheets, playing computer games, or even surfing the world wide web. A seminal example, the Gateway Destination PC-TV system, from Gateway 2000, Inc., not only weds a television to a personal computer, but allows system expansion to receive programming from internal sources such as video-cassette recorders, laser-disc players, and video cameras and from external sources such as direct-broadcast-satellite receivers, etc.

In home entertainment systems, a number of devices are often interconnected. Such devices may include various components such as a VCR, laser disc player, a stereo receiver, speakers, a television, a CD-player/recorder, a tape deck, equalizers, amplifiers, and the like. Increasingly, personal computers, with their attendant peripherals such as a DVD-ROM drive, printer, scanner, mass storage, internet browsers and other programs, mouse or pointing device, and the like have been used in home entertainment systems.

One problem in owning and operating a PC-TV system concerns adding and controlling new components. Conventional PC-TV systems generally use a categorical, one-size-fits-all approach, to controlling new components and thus include a very basic set of controls for all external components. For example, these systems provide a basic VCR category which typically only includes play, stop, pause, fast-forward, and rewind commands. Yet, many VCRs include more functionality, such as frame advance, set-up menu, programming, and so forth which is inaccessible through these controls. Thus, the limited basic controls of conventional PC-TV systems are more or less useless with the broad range of extra functions inherent to many components.

Currently, there are several partial solutions to this problem. One is the DestiVu (tm) AV Panel which provides static user interface (UI) controls for categories of devices. Individual functionality of an attached device is not available in the DestiVu system.

Through the use of simplified templates, the user may use "least common denominator" interface elements. For example, any VCR identified as a VCR will have certain core functions, such as "play," "record," "stop," and the like. Many VCRs have a wide variety of further functions not necessarily present on all VCRs. The "least common denominator" solution does not provide access to the further functionality.

A second is the Crestron wireless remote control touchpad provides a graphical user interface (GUI) on a large hand held touch sensitive input device. However, the user interface elements must be manually placed in the user interface by the end user of the system. Similarly, each component capable of attachment to a system has its own set of functions it is capable of performing. Not all components will have the same features, but each component in a device category will meet a minimum standard of functions. This minimum standard of core functions is called the "least common denominator." Each device of a certain type will have at a minimum the "least common denominator" features.

Further, the Crestron solution uses a proprietary operating environment for generating its graphical user interface. The Crestron system is constructed to operate only on a proprietary platform. If the user is unaware of certain functions a device is capable of performing, the functionality of those features will not be present in the constructed user interface.

A third partial solution is the Phast Landmark (tm) system. The Phast system uses complex UI elements to describe many external devices. However, like the Crestron system, the Phast solution forces users to go through an elaborate manual setup procedure to define the interfaces for particular devices. In a windows environment, this entails a drop-and-drag technique. As in the Crestron system, if the user is unaware of certain functions a device is capable of performing, the functionality of those features will not be present in the constructed user interface.

Computer-based home entertainment systems are interconnecting an increasing number of components. Not all of these components can be connected directly to the computer-based controller. Current computer-based television solutions either support an internal tuner or tuners directly connected to an audio/video input on the computer based controller. Tunable devices such as televisions, stereo receivers, VCRs, satellite dishes, and the like are not supported by the current solutions if they are not connected directly to the computer-based controller. Tunable devices such as those described have a set of channels or stations which are available for viewing or listening.

Home entertainment systems may have a variety of peripheral devices connected together to from a complete system. Computers are increasingly more likely to be contained in such a home entertainment system. Peripheral devices are connectable to the system in any number of different configurations. A representative but not exhaustive list of such peripheral devices includes tunable devices such as television, VCR, Video Disk Player, Satellite Dish, and Stereo receiver. Each of these devices may be connected to various channel receiving components, such as an antenna, a satellite dish or satellite receiving system, a cable television cable, and combinations thereof. Further peripheral devices which may be connected to a computer-based home entertainment system may include, by way of example, DVD players, CD-ROMs, amplifiers, and equalizers. These further devices may also be connected to various channel receiving components, but are often connected simply to the computer via a direct connection to a computer-based controller or the like.

Accordingly, there is a need for a system with a much broader range of controls that can address the broad functionality not generally controllable using conventional control architectures.

SUMMARY OF THE INVENTION

To address these and other shortcomings, the inventor devised a computer-based system used to represent in a graphical user interface the interconnected components or peripheral devices of a home entertainment system. An embodiment of the computer-based system of the present invention includes a comprehensive database of device functionality capabilities, user interface elements, and channel maps, and a mechanism which responds to the addition of a new component by searching the database and constructing a specific control interface. The specific control interface addresses all the capabilities and functions of the new component without the need for manual input of functions and capabilities by the user.

A method of operating the computer-based system is also embodied by the present invention. The method comprises providing a database listing functions of one or more peripheral devices and corresponding graphical-user-interface elements (objects) for accessing the functions, searching the database for a particular media device, and displaying a graphical user interface for the particular media device based on functions and corresponding graphical user interface elements listed in the database.

In a further embodiment of the present invention, the interconnection of various components is determined, and tunable devices connected to the system are identified by the type of connection to a further channel receiving component they employ, namely "off-air antenna," "cable," "satellite," or "no antenna." "No antenna" devices may include those directly hooked to the computer as described above, such as DVD-ROM, equalizers, amplifiers, and the like, which have functionality but not necessarily channels. A channel map for the various tunable devices is generated (or supplied in a database) and is used to identify the channels available for each device. Each tunable device propagates its available channels to the computer system (software) and each interconnecting device supplements the information appending control information and its own channel map information. The end result is a computer based model representing the components attached to the home entertainment system, and the channels they are capable of receiving, their available channels.

Further embodiments of the present invention include a database containing information concerning not only the channel map of connected devices, but also the functionality of devices and non-device specific user interface protocols from a database containing functionality information and user interface protocols. A user interface assembly program or module creates a computer based set of objects in a GUI allowing control of the devices attached to the system. Instead of requiring the user to generate manually a list of the available functions, capabilities, and available channels of the devices attached to the system, this embodiment uses a series of user interface elements or protocols which can be retrieved from the database when it has been successfully queried as to the functionality of the attached components.

A further embodiment of the present invention comprises a computer system having a first device database, and a software program having database lookup capabilities for all devices from a device database, and a second database for the retrieval not only of available channels for the device, but also the elements or user interface protocols for the generation of a computer based system of objects displayable on a computer screen allowing for computer control of all aspects of the computer based home entertainment system.

Other embodiments and advantages of the invention will become apparent after considering the accompanying drawings and the following detailed description.

BRIEF DESCRIPTION OF THE DRAWINGS

FIG. 3 is a flowchart block diagram of another method embodiment of the present invention;

FIG. 4 is a flowchart block diagram of another method embodiment of the present invention.

DETAILED DESCRIPTION OF THE PREFERRED EMBODIMENTS

In the following detailed description of the embodiments, reference is made to the accompanying drawings which form a part hereof, and in which is shown by way of illustration specific embodiments in which the invention may be practiced. It is to be understood that other embodiments may be utilized and structural changes may be made without departing from the scope of the present invention.

Figure 1:
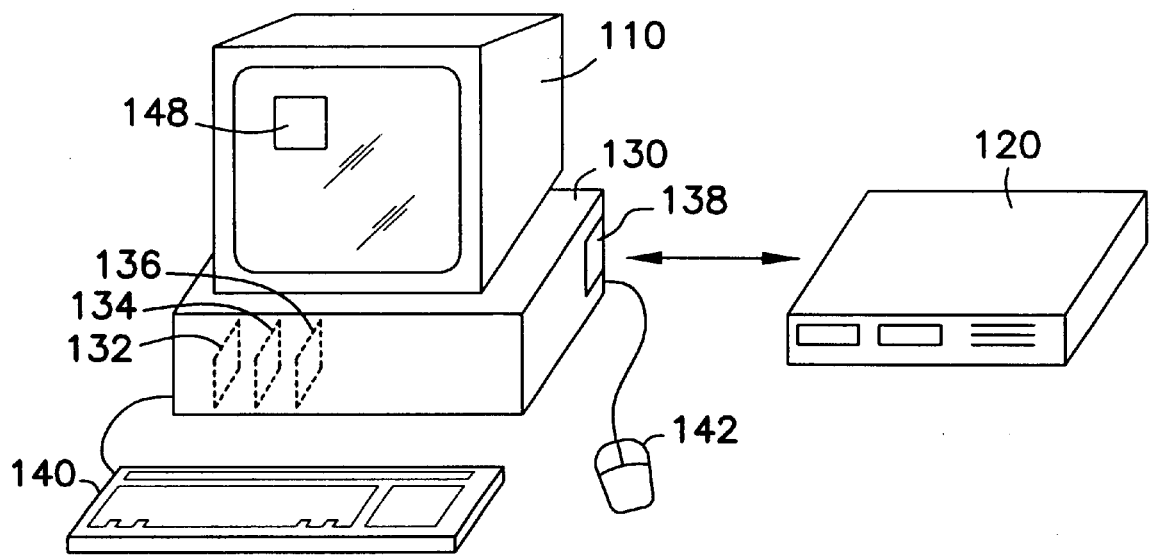
FIG. 1 is a perspective view of an embodiment of the present invention.

The following detailed description, which references and incorporates FIGS. 1–4, describes and illustrates various embodiments of the invention. FIG. 1 shows a PC-TV (or convergence) system 100 including a database which includes data about functionality of peripheral devices, user interface elements, and channel maps for various channel receiving configurations such as antenna, cable, and satellite. Specifically, PC-TV system 100, which may incorporate features of the Destination PC-TV system from Gateway 2000, Inc. of North Sioux City, S. Dak., includes a monitor 110, at least one peripheral device 120 such as a tuner/receiver, VCR, video disc player, satellite dish, and the like, and a personal computer 130. Monitor 110, the heart of the system from a user perspective, displays video programming from peripheral devices 120 or personal computer 130.

Peripheral device 120 receives audio, video or digital data signals via direct connection or wireless coupling to a multi-channel programming source. Examples of multi-channel programming sources include satellite television and radio broadcasts, cable television transmissions, traditional television transmissions, radio broadcasts, and the like. A plurality of peripheral devices may be connected to or in communication with a variety of programming sources by a variety of configurations. Such configurations include antenna, cable, satellite, and no-antenna.

Personal computer 130, operatively coupled to monitor 110 and device 120, includes by way of example but not limitation a processor 132, a local memory 134, a mass-data-storage device 136, a modem 138 and a set of user interface devices including, for example, a keyboard 140 and a mouse or other pointing device 142 all of which support user interaction with a graphical user interface or operating system, such as a version of Microsoft Windows.

Figure 1A:
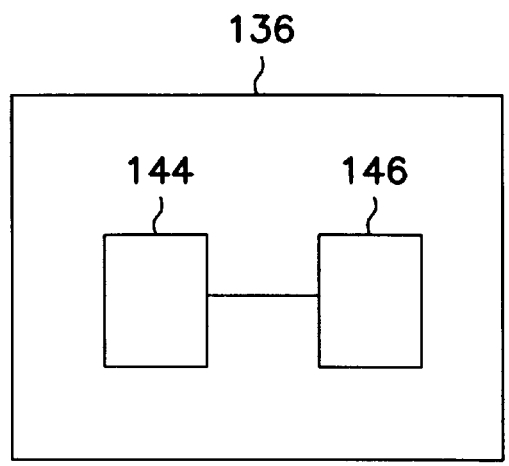
FIG. 1a is a block diagram view of an embodiment of the mass storage device shown in FIG. 1.

Mass data storage device 136 is shown in greater detail in FIG. 1a. Mass data storage device 136 preferably includes a hard drive which stores software including various user programs, an operating system, communications software, and the like. It should be understood that the configuration of the system 100, including computer 110 and mass storage 136 may be changed to include additional components, or to delete components, without deviating from the scope of the invention. Such alternate configurations are well known in the art.

Additionally, storage device 136 stores a comprehensive peripheral device functionality and user interface element database 144. Database 144 preferably contains comprehensive information pertaining to the functionality of peripheral devices, including brands, models, and types. Database 144 further preferably contains a comprehensive set of user interface build elements, also called protocols, designed to provide the blocks for building graphical user interfaces modeling the functions and features of peripheral devices 120 connected to computer 130 and system 100. User interface build elements are designed to replicate the various functions and features of peripheral devices 120 in a graphical user interface environment. The user interface elements described are treated as individual objects within the software architecture, allowing more flexibility in design and the capability of introducing the entire system to other computing platforms.

Database 144 further contains channel map information pertaining to available channels from various sources, including as discussed above cable, satellite, and antenna. Database 144 may be split into separate databases, such as a device functionality database, a user interface element database, and a channel map database, without departing from the scope of the invention.

Storage device 136 stores an interface-assembly program or software module 146. Graphical user interface assembly program 146 contains a set of machine readable instructions for communicating with the various databases 144, and, through computer processor and memory, the connected peripheral devices 120, and thereafter to construct a graphical user interface 148 for display on monitor 110. The software module 146 of the present invention may be implemented by computer programs of machine-executable instructions written in any number of suitable languages and stored on machine or computer readable media such as disk, diskette, RAM, ROM, or other device commonly included in a personal computer such as computer 130.

For example, the database may contain a peripheral device description for an attached peripheral device such as a VCR. Typical functionality information contained in the database includes the following functions: play, stop, pause, fast forward, rewind, frame advance, frame speed, tape speed, and menus. Thus, in response to detecting that the VCR is connected to one of the system input ports of computer 130, system 100 would determine which graphical user interface objects, or elements, are available to control the identified functions of the VCR. In other words, the system 100 searches an interface object database 144 for elements that correspond to each identified function of the VCR, and returns links to the objects. In this example, searching the resource database yields the following interface objects: play, stop, pause, fast-forward, rewind, frame-advance, frame-speed slider, tape-speed selector, and set-up menu items. The interface assembly program 146 then assembles these objects into a specific graphical user interface for the VCR. This graphical user interface 148 is displayed on monitor 110 for control of the connected VCR from the screen of monitor 110.

Construction of the graphical user interface of the present invention is accomplished without the requirement for manual user input. The functions of preferably the vast majority of peripheral devices available for connection to a computer based home entertainment system such as system 100 are contained in the database 144. Database 144, or individual databases containing portions of the database 144, may be easily updated and replaced entirely. The present invention is therefore not limited to the "least common denominator," instead generating comprehensive graphical user interface controls for all of the functionality of the connected peripheral devices.

Graphical user interface assembly program 146 may also contain instructions for communication with various peripheral devices 120 to determine the functionality of the peripheral devices if the device functionality is not available in the database 144. Once functionality is determined, the software program retrieves the appropriate user interface elements from database 144 for construction of the graphical user interface 148.

Figure 2:
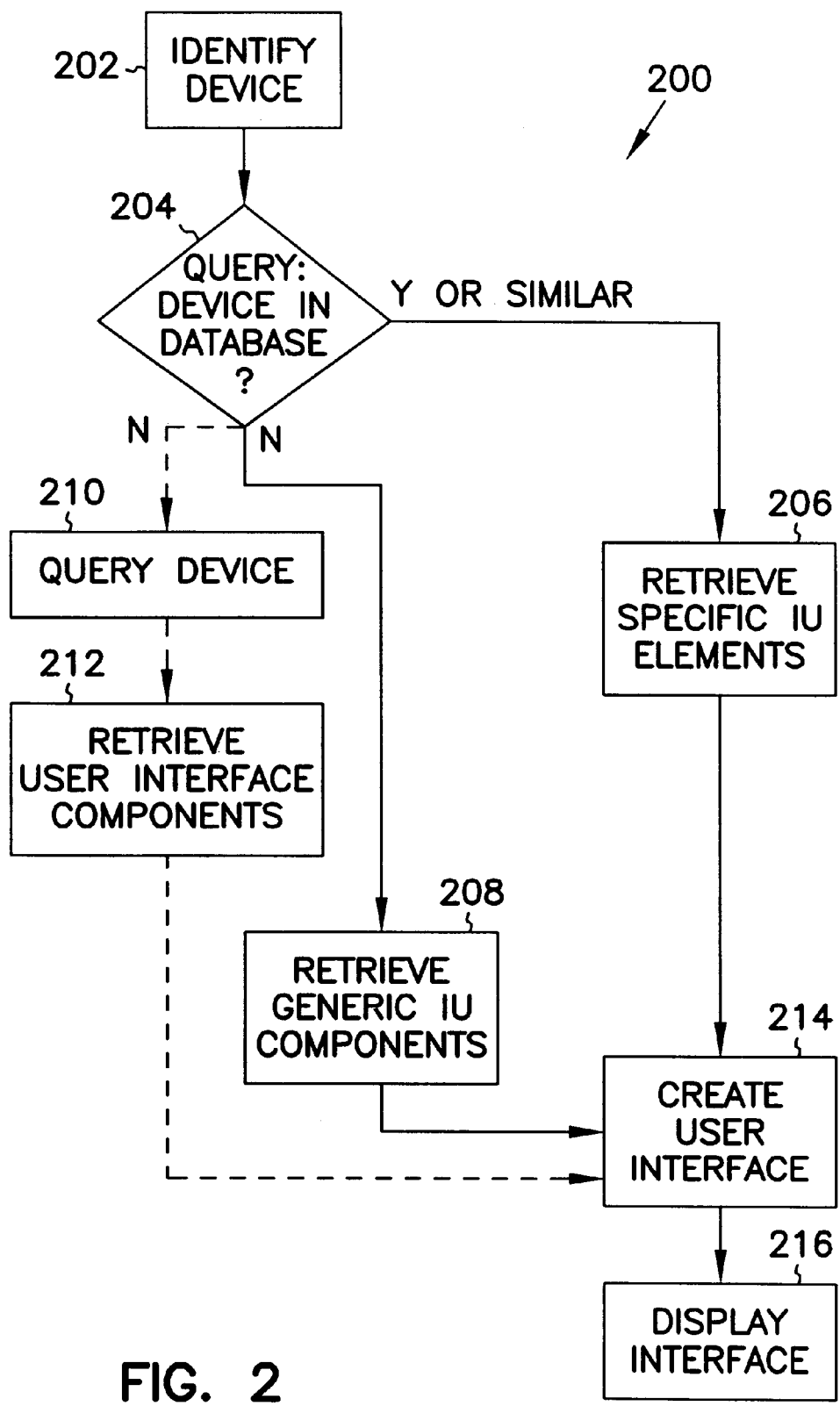
FIG. 2 is a flowchart block diagram of a method embodying the present invention.

Referring now to FIG. 2, a method embodiment 200 for generating a computer-based model of connected peripheral devices in a home entertainment system comprises identifying a peripheral device connected to the computer in block 202, and querying a database regarding functionality of the identified device in block 204. If the device is in the database, device specific user interface elements for the specific device are retrieved in block 206. If the device is similar to a device in the database, in that the functions are nearly the same, device specific user interface elements are retrieved in block 206 as well. If the device is not in the database, generic user interface elements are retrieved in block 208. Alternatively, the device not in the database may be queried to determine specific functionality in block 210 and user interface elements retrieved in block 212. Once user interface elements have been retrieved in blocks 206, 208, and 212, graphical user interface (GUI) objects from the user interface elements are created in block 214, and displayed on the computer monitor in block 216.

Another embodiment of the present invention comprises a machine readable medium comprising machine readable instructions for causing the computer to perform the method shown in FIG. 2. As has been mentioned, the machine readable instructions may be generated in any number of computer languages, and for implementation on any number of different computer operating systems and configurations.

Yet another embodiment 300 of the present invention is shown in FIG. 3, and comprises a method of operating a computerized home entertainment system, comprising providing a database listing functions of one or more peripheral connected or interconnected devices and corresponding graphical-user-interface elements (objects) for accessing the functions of the connected peripheral devices in block 302, searching the database for a particular peripheral device which is connected to the computer in block 304, and displaying a graphical user interface for the particular media device based on functions and corresponding graphical user interface elements listed in the database in block 306.

A number of peripheral devices 120 may be attached to the system in known fashion. Such attachments or connections include but are not limited to wire connections directly to the audio/video input of the computer-based controller, or interconnected in a chain-like fashion between components. Each peripheral device is therefore connected to or interconnected with the system, but need not be directly connected to the internal tuner connected to the audio/video input of the system.

Each peripheral device has its own connection or link to a source of programming or channels available for its use. For example, the devices may receive programming information from an off-air antenna, a cable line, a satellite link, or the like. In addition, certain peripheral devices might not be attached to any antenna at all. These no antenna devices include DVD-ROM, CD-ROM, laserdisc, equalizers, amplifiers, and the like.

Each peripheral device has its own set of channels or signals which it is capable of receiving. The channels a device is capable of receiving are referred to as its available channels. Each device further has specific functionality which determine how the device is tuned to a particular available channel, as well as control information.

Another embodiment of the present invention gathers from each peripheral device 120 attached to or interconnected with a system the type of connection the device has to its programming source, that is antenna, cable, satellite, or no antenna. Also, the embodiment gathers from each device a list of its available channels. Tuning information, specifically the operations or instructions required to tune each various peripheral device to a specific available channel, is also gathered. From the gathered information, a computer based channel map may be generated for the entire system.

Each peripheral device provides to the channel map its functionality, tuning information, connection information, and available channels. A computer based model of the entire system us generated from the information received from the attached or interconnected devices.

In FIG. 4, a method 400 embodying the generation of a computer based model comprises identifying peripheral devices as attached or linked to an antenna, no antenna, cable, or satellite in block 402. The available channels for each device are identified in block 404. The devices propagate their channel information through the model in block 406. Control information and channel map information for the peripheral devices is appended to the model in block 408. The generated computer based model provides a way to operate the functionality of each peripheral device from a computer based user interface. The computer model generated may be stored in a data structure in machine readable format in the computer system.

Figure 5:
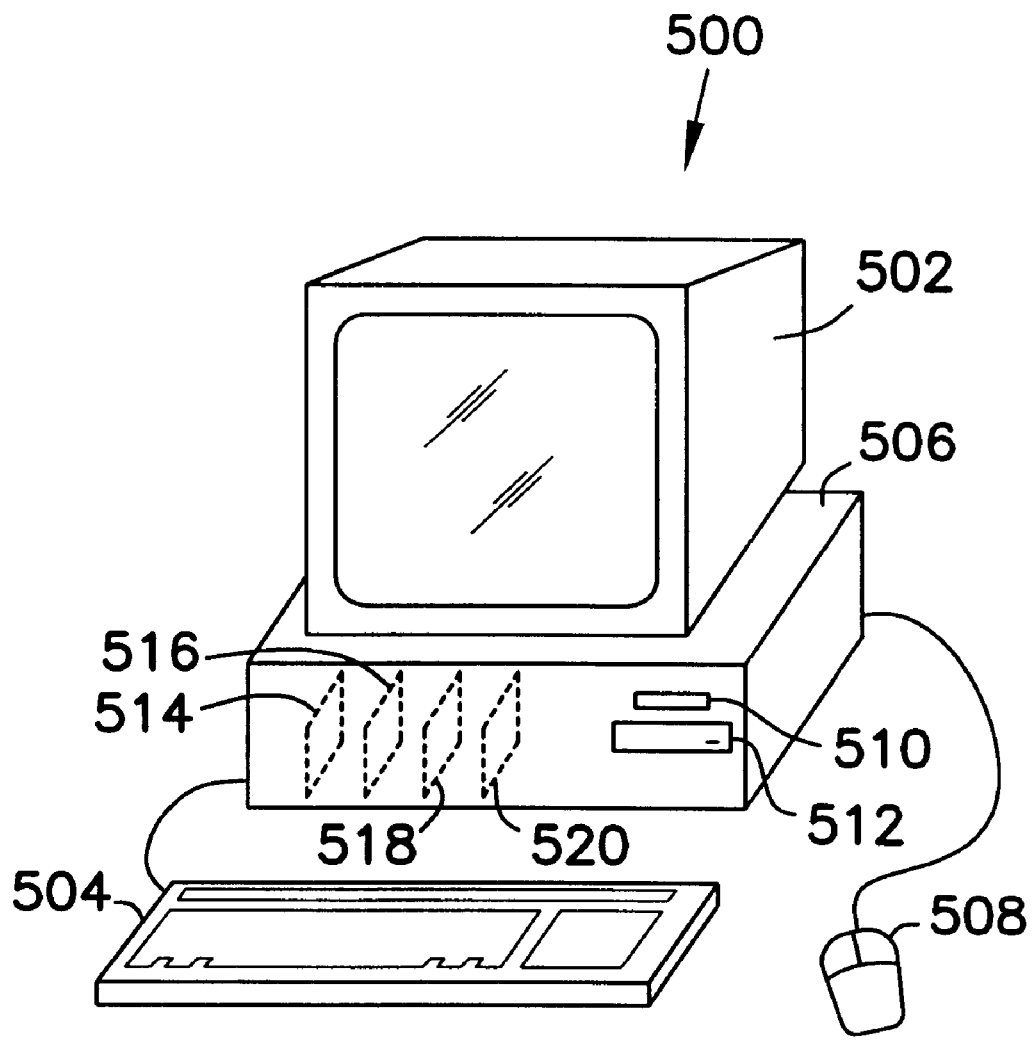
FIG. 5 is a perspective view of a computer system embodiment of the present invention.

Personal computers, as shown in FIG. 5, typically include a monitor 502, keyboard input 504, central processing unit 506, and a pointing or selection device such as mouse 508. Further components of a typical computer system may include a machine readable storage media such as disk drive 510, hard disk, CD-ROM 512, DVD, modem, and the like. The processor unit of such a computer typically includes a microprocessor, memory (RAM and ROM), and other peripheral circuitry, not shown.

The computer programs run on the central processing unit 506 out of main memory, and may be transferred to main memory from permanent storage via disk drive 510 or CD-ROM 512 when stored on removable media or via a network connection or modem connection when stored outside of the personal computer, or via other types of computer or machine readable medium from which it can be read and utilized. The computer programs comprise multiple modules or objects to perform the methods 200, 300, or 400, or the functions of the modules in apparatus 100. The type of computer programming languages used to write the code may vary between procedural code type languages to object oriented languages. The files or objects need not have a one to one correspondence to the modules or method steps described depending on the desires of the programmer. Further, the method and apparatus may comprise combinations of software, hardware and firmware as is well known to those skilled in the art.

An embodiment of a computer system 500 for creating graphical user interface objects includes a device database 514 containing functionality information pertaining to peripheral devices, a resource database 516 containing user interface components or build elements, a channel map database 518, and a graphical user interface object assembly program or module 520, which are stored in computer mass storage. These components have been described above. The components 514, 516, and 518 may be combined into one or more databases without departing from the scope of the invention. Further, the graphical user interface object assembly program or module 520 may also be combined with the databases to form a single program for performing the methods and constructing the apparatuses discussed herein.

CONCLUSION

The present invention, a system and method of creating computer-based models of a home entertainment system in a graphical user interface, allows for the construction of a computer based model of a home entertainment system and its peripheral devices without requiring input from the user.

The embodiments described above are intended only to illustrate and teach one or more ways of practicing or implementing the present invention, not to restrict its breadth or scope. The actual scope of the invention, which encompasses all ways of practicing or implementing the invention, is defined only by the following claims and their equivalents.

What is claimed is:

1. A method of generating a user interface for computer operation of a peripheral device connected to a computer, comprising:

identifying the peripheral device connected to the computer;

determining the peripheral device functionality by querying a device database;

determining if the peripheral device is a tunable device, and if so, determining a channel map of available channels for the tunable device and adding the channel map to a system wide channel map;

retrieving device specific graphical user interface elements that correspond to the peripheral device functionality from the database; and constructing a graphical user interface from the retrieved interface elements.

2. A machine readable medium comprising machine readable instructions for performing a method comprising:

identifying an external device attached to a computer;

searching a database containing functionality information about the external peripheral device;

retrieving from the database the functionality information of the external device attached to the computer;

determining if the external device is a tunable device, and if so, determining a channel map of available channels for the external device and adding the channel map to a system wide channel map;

searching the database for user interface protocols for the retrieved functionality of the attached device;

retrieving from the database interface protocols corresponding to the attached external device;

constructing graphical user interface objects corresponding to the functionality of the attached external device; and displaying the graphical user interface objects on the computer screen for selection by the user.

3. A method of generating external device user interfaces on a computer having a computer screen, comprising:

identifying an external device attached to the computer;

querying a device database containing functionality information about external devices;

retrieving functionality information pertaining to the external device from the device database;

determining if the external device is a tunable device, and if so, determining a channel map of available channels for the external device and adding the channel map to a system wide channel map;

querying a resource database for interface protocols for the identified external device;

retrieving interface protocols from the resource database for the identified external device;

creating graphical user interface objects for functions of the external device corresponding to the functionality information; and displaying the graphical user interface objects on the computer screen.

4. A computer system for creating a user interface for an attached device, comprising:

a computer;

a device database containing functionality information pertaining to external devices;

a resource database containing graphical user interface components associated with functional capabilities of external devices; and a software module for searching the device and resource databases for information pertaining to the attached device, for determining if the attached device is a tunable device, and if so, determining a channel map of available channels for the attached device and adding the channel map to a system wide channel map, and for creating graphical user interface objects on the computer screen for allowing a user to control the functions of the attached device from the computer, wherein the graphical user interface objects are created according to the information from the device and resource databases.

5. A computer based home entertainment system, comprising:

a computer;

a plurality of peripheral devices operatively electrically connected to the computer;

a software module residing in computer memory, the software module comprising a device database containing functionality information about peripheral devices, a resource database containing graphical user interface elements implementing functions of peripheral devices, and a set of machine readable instructions for determining if a peripheral device is a tunable device, and if so, determining a channel map of available channels for the peripheral device and adding the channel map to a system wide channel map, and for querying the databases and for generating user interface objects from the information obtained from the databases and from the plurality of peripheral devices; and a graphical user interface configured to display objects for the particular peripheral devices based on functions and corresponding graphical user interface elements listed in the database.

6. A computer system for control of tunable devices, comprising:

a computer a plurality of tunable devices operatively electrically connected to the computer; and a software module loaded into the memory of the computer, the software module for generating graphical user interface elements representing the plurality of tunable devices, for control of the tunable devices, wherein the software module comprises:

machine readable instructions for determining the identity of the plurality of tunable devices connected to the computer, for searching a database containing functionality information about tunable devices, for determining a channel map of available channels for at least one of the tunable devices and adding the channel map for the tunable to a system wide channel map, for retrieving from the database functionality information and graphical user interface protocols for the retrieved functionality of the connected devices, for retrieving from the database interface protocols corresponding to the connected devices, for constructing graphical user interface objects corresponding to the functionality of each connected tunable device, and for displaying the graphical user interface objects on the computer screen for selection by a user.

7. The computer system of claim 6, wherein each of the plurality of tunable devices is controllable by the graphical user interface.

8. A method for generating graphical user interface objects for a plurality of external devices operatively electrically connected to a computer, the method comprising:

identifying the external devices connected to the computer;

querying the database for functionality information pertaining to the connected devices;

determining if the connected device is a tunable device, and if so, determining a channel map of available channels for the connected device and adding the channel map to a system wide channel map;

querying the database for graphical user interface elements corresponding to the retrieved functionality information of the connected devices; and constructing graphical user interface objects from the graphical user interface elements for control of the external devices.

9. A computer system, comprising:

a computer;

a peripheral device operatively connected to the computer;

a database module containing functionality and graphical user interface elements for peripheral devices;

a channel map generator module operable to determine if a peripheral device is a tunable device, and if so, determining a channel map of available channels for the peripheral device and adding the channel map to a system wide channel map;

a graphical user interface object generator module in data communication with the database module and with the peripheral device for gathering information about the device from the device, and for querying the database as to functionality of the device and graphical user interface elements for creation of a graphical user interface object for control of the peripheral device; and a graphical user interface object displayed on the computer screen for control of the peripheral device.

10. A method of generating a computer model of an audio/video system, comprising:

identifying peripheral devices attached to the system;

identifying the connection type for each peripheral device;

identifying available channels for each peripheral device;

propagating a channel map of available channels for the peripheral devices through the model to create a system wide channel map; and appending control information for each peripheral device to the model.

* * * * *